United States Patent [19]

Kurotsu

[11] Patent Number: 5,323,397
[45] Date of Patent: Jun. 21, 1994

[54] INTERFACE CONVERSION CIRCUIT
[75] Inventor: Motoya Kurotsu, Kawasaki, Japan
[73] Assignee: Fujitsu Limited, Kawasaki, Japan
[21] Appl. No.: 854,889
[22] Filed: Mar. 20, 1992
[30] Foreign Application Priority Data
  Mar. 20, 1991 [JP] Japan .................. 3-81391
[51] Int. Cl.$^5$ .................................. H04J 3/06
[52] U.S. Cl. ........................ 370/105.3; 375/118
[58] Field of Search ............ 370/105.3, 105.1, 112, 370/100.1, 77, 84; 375/118, 106, 119, 120; 328/155, 133; 331/158, 179

[56] References Cited
U.S. PATENT DOCUMENTS

| | | | |
|---|---|---|---|
| 4,392,234 | 7/1983 | Maruta | 375/118 |
| 4,535,452 | 8/1985 | Sandberg et al. | 370/105.3 |
| 4,811,341 | 3/1989 | Fujimoto et al. | 370/105.3 |
| 5,162,746 | 11/1992 | Ghoshal | 375/118 |

Primary Examiner—Douglas W. Olms
Assistant Examiner—Dang Ton
Attorney, Agent, or Firm—Staas & Halsey

[57] ABSTRACT

The present invention relates to an interface conversion circuit for conversion of the frame structure of a first interface, such as a U-interface, into a second interface to ensure that the phase relation between frame clocks of both the first interface and the second interface is kept constant during communications by absorbing the jitter between the frame clocks of both interfaces when no certain phase relation is established between the frame clocks when the frame structure of the first interface is converted into the second interface. The interface conversion circuit according to the present invention includes a reception timing signal generator and second interface timing signal generator. The reception timing signal generator is adapted to shift the window signal WND and half window signal HWND, respectively, a predetermined number of bits ahead when the second interface frame clock MTC from the second interface timing signal generator lies in the former half of the window signal WND. The reception timing signal generator is adapted to shift the signals WND and HWND, respectively, a predetermined number of bits back when the second interface frame clock MTC from the second interface timing signal generator lies in the latter half of the window signal WND.

8 Claims, 12 Drawing Sheets

INTERFACE CONVERSION CIRCUIT

BACKGROUND OF THE INVENTION

1. Field of the Invention

The present invention relates to an interface conversion circuit for a conversion of the frame structure of a first interface, such as a U-interface into a second interface (other interface).

2. Description of the Related Art

The connection between a station and terminal equipment in, for example, an ISDN (integrated services digital network) is shown in FIG. 7. In FIG. 7, the reference numeral 101 indicates a station and the reference numeral 102 indicates terminal equipment. A network terminating unit (OCU) 103 in the station 101 and a subscriber terminating unit (DSU) 104 in the terminal equipment 102 are connected to each other by means of a subscriber's line 105. Furthermore, a plurality of terminals (TE) 106 are connected to the subscriber terminating unit 104. The subscriber terminating unit 104 referred to herein is defined in TI. 601-1988 of ANSI (American National Standard Institute).

Note that the subscriber terminating unit 104 and subscriber's line 105 will be referred to as an "U-interface" hereinafter while the terminal 106 of the subscriber terminating unit 104 as a "S/T-interface".

The subscriber terminating unit 104 is provided with a U-interface circuit 107 and a S/T-interface circuit 108 as shown in FIG. 8.

The U-interface circuit 107 converts the frame construction of the U-interface into another interface (will be referred to as "A-interface" hereinafter), and the S/T-interface circuit 108 converts the frame structure of the A-interface into an S/T-interface.

A super frame [see FIG. 12 (a)] consisting of eight basic frames has to be used for the flow of information on the U-interface as stipulated in TI. 601-1988 of ANSI.

In FIG. 12 (a), ISW are bits for an inversion-synchronous word, SW are bits for a synchronous word, 2B+D are bits for a customer data channel and M are bits for a maintenance channel. The basic-frame period is 1.5 ms (millisecond). The super frame has eight basic frames, so its period is 12 ms.

As shown in FIG. 12 (b), the A-interface has a super frame structure consisting of 96 frames (A1, A2, ..., A96). The frame period is 125 μs (microsecond). Since the super frame consists of 96 frames, its period is 12 ms.

In the case of a conversion from a U-interface into an A-interface, the scale of a latch circuit in a MUX (multiplexer) can be minimized by establishing a certain phase relation between the super frames of the two interfaces.

FIG. 9 is a block diagram of a conventional U-interface circuit. As shown, the U-interface circuit comprises a reception timing signal generator (RTIM) 201 and an A-interface timing signal generator (ATIM) 202.

A block diagram showing the reception timing signal generator 201 used in the conventional interface conversion circuit is shown in FIG. 10. Receiving a 160 kHz reception clock R160K (produced by a frequency division of a signal generated by DPLL and which is synchronous with 80 kHz signal of the U-interface) and a reception counter output signal (output signal from a reception counter that receives the 160 kHz reception clock R160K), the reception timing signal generator 201 produces a window signal WND having a predetermined time duration of 20 bits, which indicates the frame top position of the A-interface. For this purpose of producing the window signal WND, the reception timing signal generator 201 has a decoder 203 and a JK flip-flop 204.

The decoder 203 receives a reception counter outer signal and produces signals indicative of an a-bit position and (a+20)-bit position, respectively, of the super frame on the U-interface. The JK flip-flop 204 is provided to produce, from the signal from the decoder 203 and the 160 kHz reception clock R160K, a window signal WND having a predetermined time duration of 20 bits indicative of the frame top position on the A-interface.

Since the signal speed of the U-interface is 160 kbps (kilobits per sec) in this case, transmission of 20 bits over the U-interface takes 125 μs. Therefore, the window signal WND has a time duration of 20 bits (125 μs) on the U-interface.

The A-interface timing signal generator 202 as shown in FIG. 11 is adapted to determine the frame top position in the A-interface based on the window signal WND from the reception timing signal generator 201, an A-interface frame clock MTC and an A-interface bit clock C. To this end, the A-interface timing signal generator 202 comprises a differentiation circuit 205 and an A-interface counter load signal output unit 206.

The differentiation circuit 205 comprises two D flip-flops. Receiving the A-interface frame clock MTC and an A-interface bit clock C, this circuit 205 takes out one bit from the top of the A-interface frame clock MTC.

The A-interface counter lock signal output unit 206 has two AND gates (one of which receives an inversion output from the differentiation circuit 205). The output unit 206 ANDs the A-interface frame clock MTC with the inversion output from the output-stage flip-flop of the differentiation circuit 205 and also ANDS this AND output with the window signal WND to produce an A-interface counter load signal.

Because of the above-mentioned arrangement, a window signal WND having a time duration of 20 bits (125 μs) is produced in a position on the U-interface to which it is desired to bring the top of the super frame of the A-interface as shown in FIG. 13 (a) to (d), thereby taking as the top of the super frame the top of an A-interface frame clock MTC having a time period for which the window signal WND is "H". Namely, it is necessary that the top A1 of the super frame should always be completely synchronous with the frame clock MTC.

It should be noted here that there is no certain phase relation between the U-interface reception clock and A-interface frame clock. Namely, "tp" in FIG. 13 can take an arbitrary value ranging from 0 to 125 μs and the value of tp depends mainly on the timing of initial lead-in. If the tp value is constant during communications, the phase difference between both the U-interface and A-interface super frames will always be constant.

Actually, however, the tp value varies little by little because of the relative jitter between the U-interface reception clock and an A-interface frame clock.

Assume here that the variation of the tp value of one super frame is Δtp and the period of an A-interface bit clock is $T_B$. Since there is generally the following relation between the variation Δtp and period $T_B$ $$\Delta tp << T_B ... \tag{1}$$

the above jitter can be absorbed.

However, even if the equation (1) is met, the frame position may possibly be shifted one frame back or ahead when the tp value is approximate to 0 or 125 μs.

FIG. 14 (a) to (f) show that when the tp value is very near 0 μs, the A-interface frame clock MTC rises before the window signal WND in the next super frame, so that the frame position is shifted one frame back. It means that a blank will occur between the last data A96 in the preceding super frame and the first data A in the following super frame.

FIG. 15 (a) to (f) show that when the tp value is very near 125 μs, the A-interface frame clock MTC rises before the window signal WND does in the next super frame so that the frame position is shifted one frame ahead. Namely, if the frame clock MTC rises near the fall of the window signal WND, when the preceding frame clock enters the window signal WND because of a jitter or the like, the last data A96 in the preceding super frame will be erased.

Therefore, if the window signal WND synchronous with the received signal is in a certain phase relation with the A-interface frame clock MTC in the conventional circuit, the relative jitter between clocks of both interfaces cannot be absorbed.

SUMMARY OF THE INVENTION

The present invention has an object to overcome the above-mentioned drawbacks of the prior art by providing an interface conversion circuit adapted so that the phase relation between frame clocks of a first interface such as a U-interface and a second interface such as an A-interface remains constant during communications by absorbing the jitter between the frame clocks of both the interfaces when no certain phase relation is established between the frame clocks when the frame structure of the first interface is converted into a second interface.

FIG. 1 is a block diagram showing the principle of the present invention. As shown, the interface conversion circuit for converting the frame structure of a first interface into a second interface includes a first reception timing signal generator 1 that produces a window signal having a predetermined time duration indicative of the frame top position in the second interface, and a second interface timing signal generator 2 that determines the frame top position in the second interface based on the window signal from the reception timing signal generator 1 and the frame clock of the second interface. The reception timing signal generator 1 is provided with a half window signal generator 3 to produce a half window signal having half of the time duration of the window signal, and it rises or falls simultaneously with the window signal. Also the second interface timing signal generator 2 is provided with a frame clock position judging means 4 to determine the phase the second interface frame clock has with respect to the window signal based on the window signal from the reception timing signal generator 1 and the half window signal from the half window generator 3, and a phase changing means 5 operative in response to the judgement output from the frame clock position judging means 4 to change the phase relation between the half window signal and frame clock.

More particularly, the reception timing signal generator 1 produces a window signal WND having a predetermined time duration that indicates the frame top position in the second interface. The second interface timing signal generator 2 is provided to determine the frame top position in the second interface based on the window signal WND from the reception timing signal generator 1 and the second interface frame clock MTC.

Also the half window signal generator 3 provided in the reception timing signal generator 1 is adapted to produce a half window signal HWND having half of the time duration of the window signal WND, and it rises or falls simultaneously with the window signal. Receiving the window signal WND from the reception timing signal generator 1 and the half window signal HWND, the frame clock position judging means 4 in the second interface timing signal generator 2 determines whether the second interface frame clock MTC lies in the former or latter half of the window signal WND. The result WNDCNT is supplied to the phase changing means 5 to change the phase of any one of the window signals WND or half window signal HWND and the frame clock signal MTC.

More specifically, the reception timing signal generator 1 is adapted to shift the window signal WND and half window signal HWND, respectively, a predetermined number of bits ahead when the result WNDCNT of the judgement is such that the second interface frame clock MTC from the second interface timing signal generator 2 lies in the former half of the window signal WND and the signals WND and HWND, respectively, and a predetermined number of bits back when it is determined that the frame clock MTC is in the latter half.

In the interface conversion circuit according to the present invention, the reception timing signal generator 1 produces a window signal WND having a predetermined time duration indicative of the frame top position in the second interface, and the second interface timing signal generator 2 determines the frame top position based on the window signal WND from the reception timing signal generator 1 and the second interface frame clock MTC. Further, the half window signal generator 3 of the reception timing signal generator 1 produces a half window signal HWND having half of the time duration of the window signal WND, and it rises or falls simultaneously with the window signal WND, and the frame clock position judging means 4 of the second interface timing signal generator 2 receives the window signal WND and a half window signal HWND from the reception timing signal generator 1 and judges whether, for example, the second interface frame clock MTC lies in the former or latter half of the window signal WND. The result WNDCNT is supplied to the phase changing means 5.

Furthermore, the phase changing means 5 is provided to shift, for example, the window signal WND and half window signal HWND, respectively, a predetermined number of bits ahead when the result WNDCNT of the judgement is such that the second interface frame clock MTC from the second interface timing signal generator 2 lies in the former half of the window signal WND and the signals WND and HWND, respectively, and a predetermined number of bits back when it is determined that the frame clock MTC is in the latter half.

DESCRIPTION OF THE PREFERRED EMBODIMENTS

Figure 1:
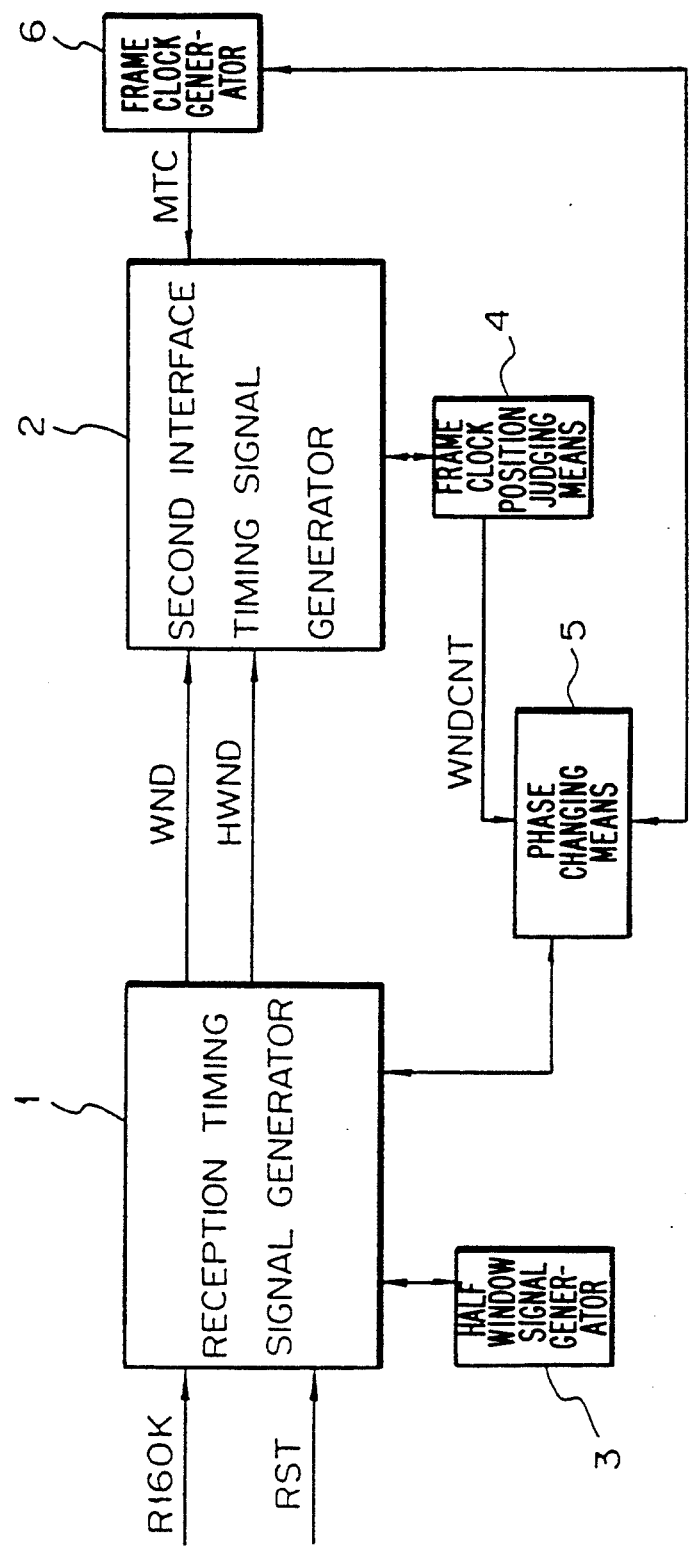
FIG. 1 is a block diagram showing the principle of the interface conversion circuit according to the present invention.

The interface conversion circuit according to the present invention will be better understood from the following description made, by way of example, of the embodiments with reference to the drawings.

The fundamental construction and principle of the interface conversion circuit according to the present invention is as described above with reference to FIG. 1. According to one aspect of the present invention, the interface conversion circuit is adapted to determine the phase relation in which the frame clock MTC stands with the window signal WND and adjust the phase relation between both these signals according to their phases. For this purpose, the window signal WND is used in conjunction with the half window signal HWND derived from a frequency division by 2 of the window signals WND, and three signals, namely, the window signal WND, half window signal HWND and frame clock MTC, are subjected to an overall comparison to judge the relation the frame clock MTC concurrently has with the window signal WND, thereby executing a predetermined operation depending upon the result.

The above-mentioned predetermined operation in the interface conversion circuit according to the present invention is to delay or advance the phase of either the frame clock MTC or the window signal WND relative to the phase of its counterpart according to whether the frame clock MTC is delayed or advanced in a phase relative to the window signal WND.

More particularly, the frame clock position judging means may be adapted to judge the tendency of a phase change of the second interface frame clock relative to the window signal. Thus, it can be determined whether the frame clock MTC is about to delay or advance in a phase relative to the window signal WND. By changing the phase based on the result of this judgment, early it is possible to effectively prevent data from being discontinued, and a blank from occurring, etc.

The frame clock position judging means may have a function to determine whether the second interface frame clock lies in the former or latter half of the window signal. The phase changing means should preferably be operative in response to the judgement-result output from the frame clock position judging means to change the phase of the frame clock a predetermined value relative to the phase of the window signal or half window signal.

Furthermore, the phase changing means according to the present invention operates in response to the judgement-result output from the frame clock positioning judging means to change the phase of the window signal or half window signal a predetermined value relative to the phase of the frame clock. Namely, the phase change may take place for either the frame clock or window or half window signal.

Therefore, the phase changing means 5 in the present invention may be connected to the reception timing signal generator 1 and the frame clock generator 6 to change the phase of the window signal WND relative to that of the frame clock MTC or phase of the frame clock relative to that of the window signal. Alternately, the phases of these signals may be changed simultaneously.

More specifically, the phase changing means may be adapted to shift the window signal or half window signal a predetermined number of bits ahead when the frame clock position judging means decides that the second interface frame clock lies in the former half of the window signal, or the window signal or half window signal a predetermined number of bits back when the frame clock position judging means decides that the second interface frame clock lies in the latter half of the window signal.

Next, the embodiment of the present invention will be described below with reference to FIG. 2.

Figure 2:
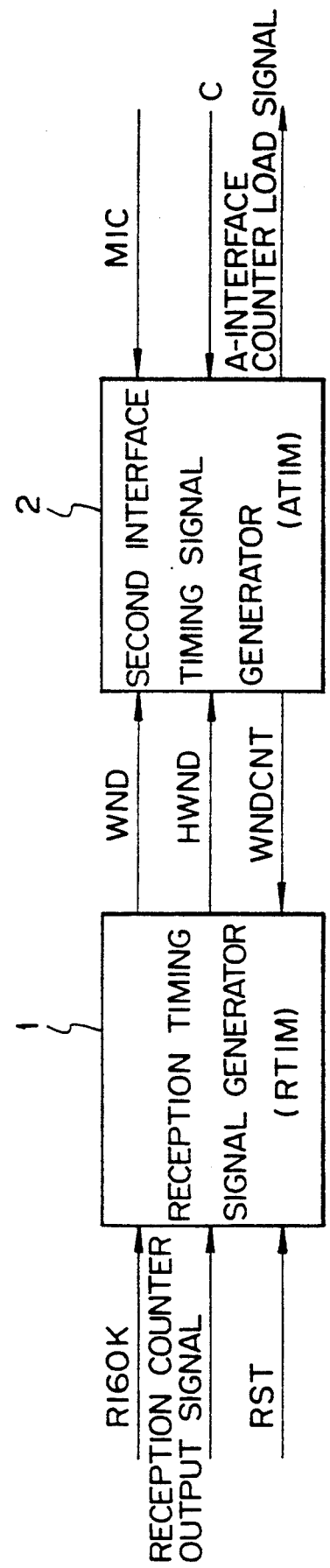
FIG. 2 is a block diagram showing an embodiment of the present invention.

FIG. 2 is a block diagram showing the first embodiment of the present invention. The U-interface circuit shown in FIG. 2 comprises a reception timing signal generator 1 and an A-interface timing signal generator (second interface timing generator) 2.

Of course, the reception timing signal generator 1 shown in the block diagram of FIG. 2 includes the half window signal generator 2 shown in FIG. 1 and the second interface timing signal generator 2 includes the frame clock position judging means 4 shown in FIG. 1. However, the half window signal generator 2 and frame clock position judging means 4 are shown in FIG. 2. The output signal WNDCNT from the frame clock position judging means 4 is referred to in the description of the phase change of the window signal WND alone, so it is not shown in FIG. 2 because the phase changing means 5 shown in FIG. 1 is included in the reception timing signal generator 1.

The reception timing signal generator 1 produces a window signal WND having a predetermined time duration of 20 bits indicative of the frame top position in the A-interface, and the A-interface timing signal generator 2 determines the frame top position in the A-interface based on the window signal WND from the reception timing signal generator 1 and the A-interface frame clock MTC. The reception timing signal generator 1 is adapted to produce a half window signal HWND having a time duration of 10 bits, half of that of the window signal WND, and it rises or falls simultaneously with the window signal WND. The A-interface timing signal generator 2 is adapted to receive the window signal WND and half window signal HWND from the reception timing signal generator 1 and judge whether the A-interface frame clock MTC lies in the former or latter half of the window signal WND to produce a judgement result WNDCNT that is supplied to the reception timing signal generator 1.

Furthermore, the reception timing signal generator 1 is adapted to shift the window signal WND and half window signal HWND, respectively, a predetermined number of bits ahead when the result WNDCNT of the judgement is such the second interface frame clock MTC from the second interface timing signal generator 2 lies in the former half of the window signal WND and the signals WND and HWND, respectively, a predetermined number of bits back when it is determined that the frame clock MTC is in the latter half.

For the above purpose, the reception timing signal generator 1 comprises a decoder 11-1, selector 11-2, a JK flip-flop 11-3, which provides a window signal output, a JK flip-flop 11-4, which provides a half window signal output, and a selector controller 11-5.

Figure 5:
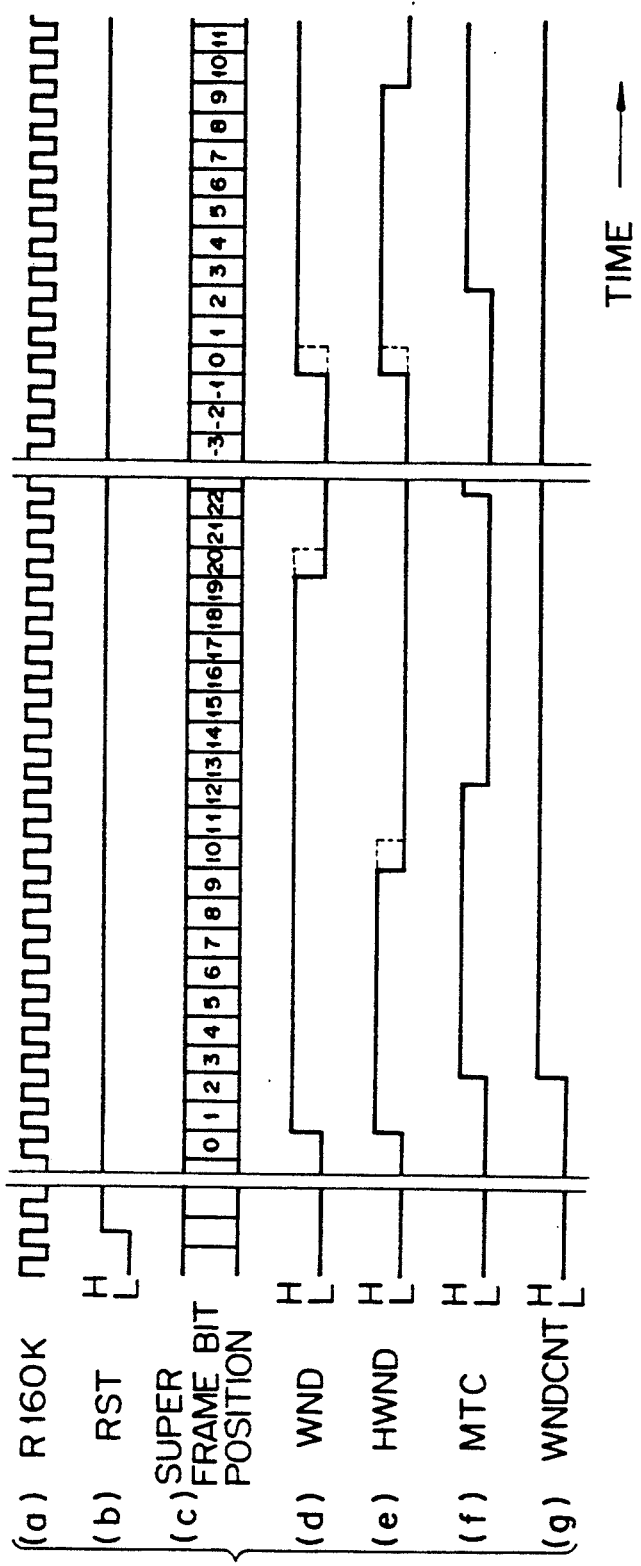
FIG. 5 is a time chart explaining the operation of the first embodiment of the present invention.
Figure 6:
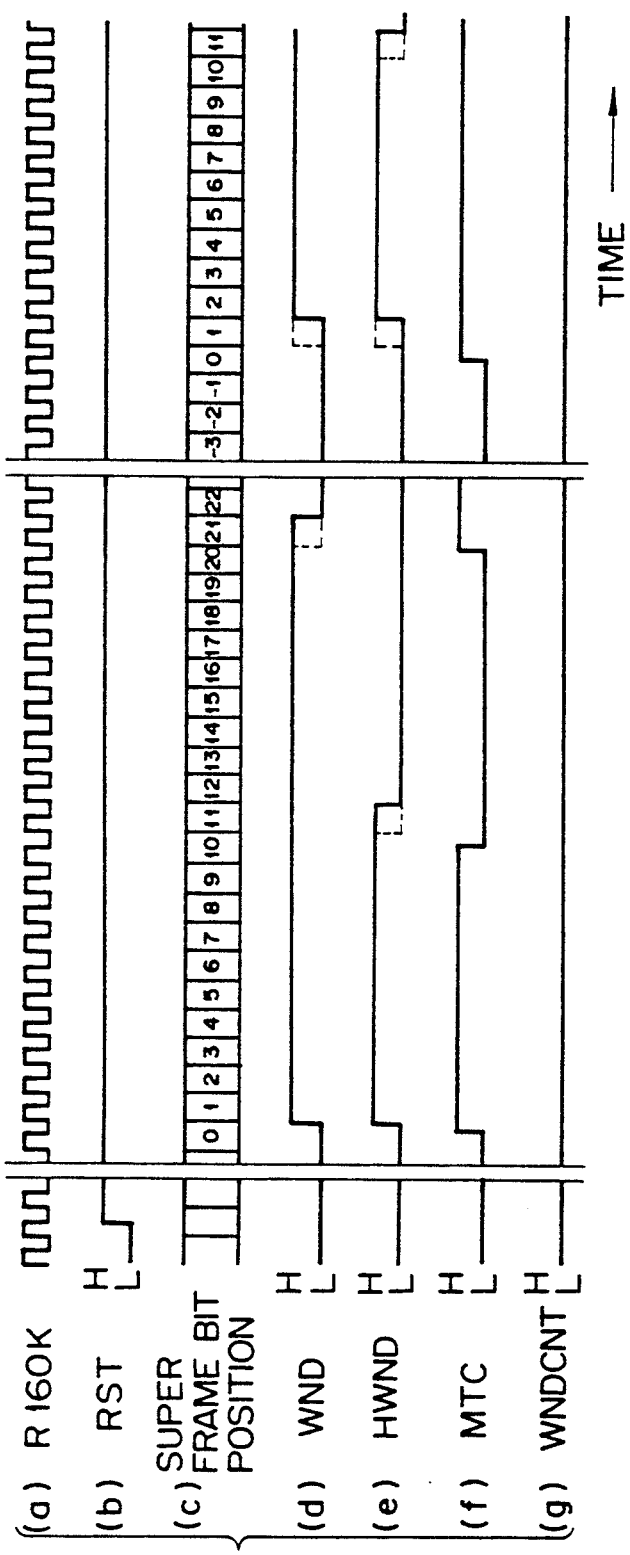
FIG. 6 is also a time chart explaining the operation of the first embodiment of the present invention.
Figure 7:
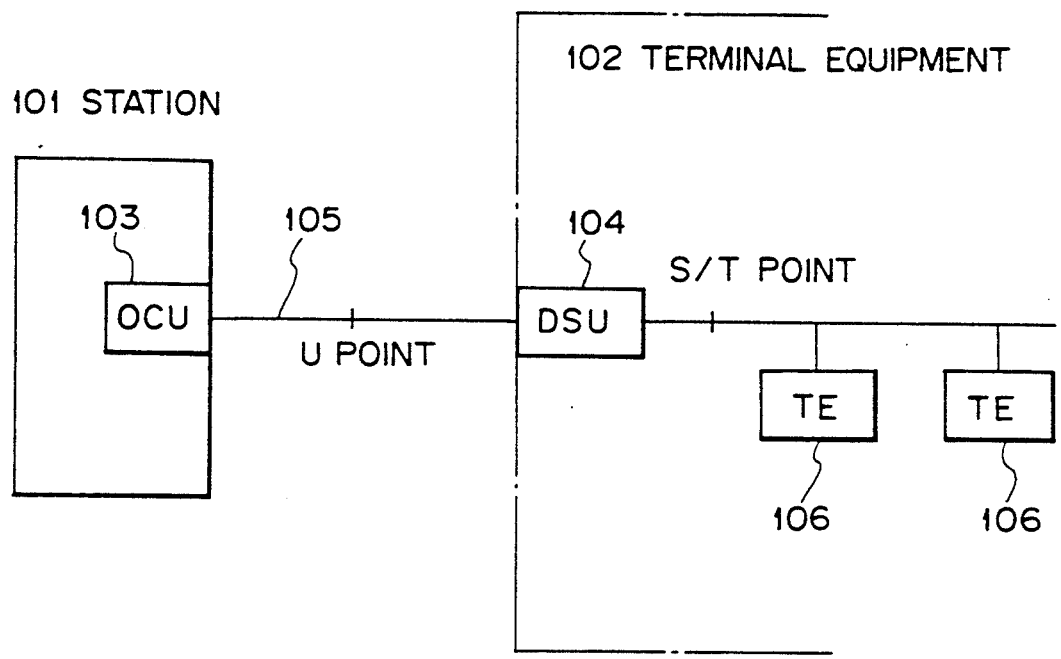
FIG. 7 is a block diagram showing the connection between the station and terminal equipment in the ISDN network.
Figure 8:
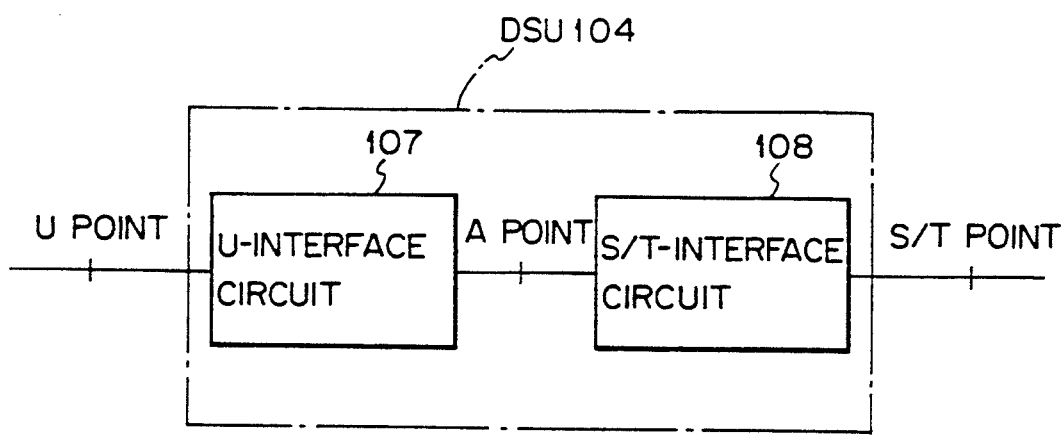
FIG. 8 is a block diagram of the subscriber terminating unit.
Figure 9:
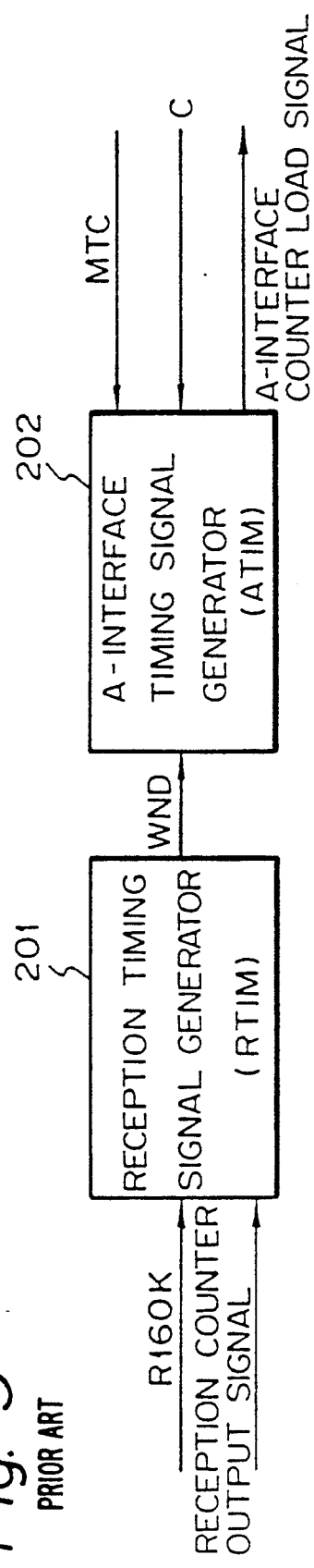
FIG. 9 is a block diagram showing an example of a conventional interface conversion circuit.
Figure 10:
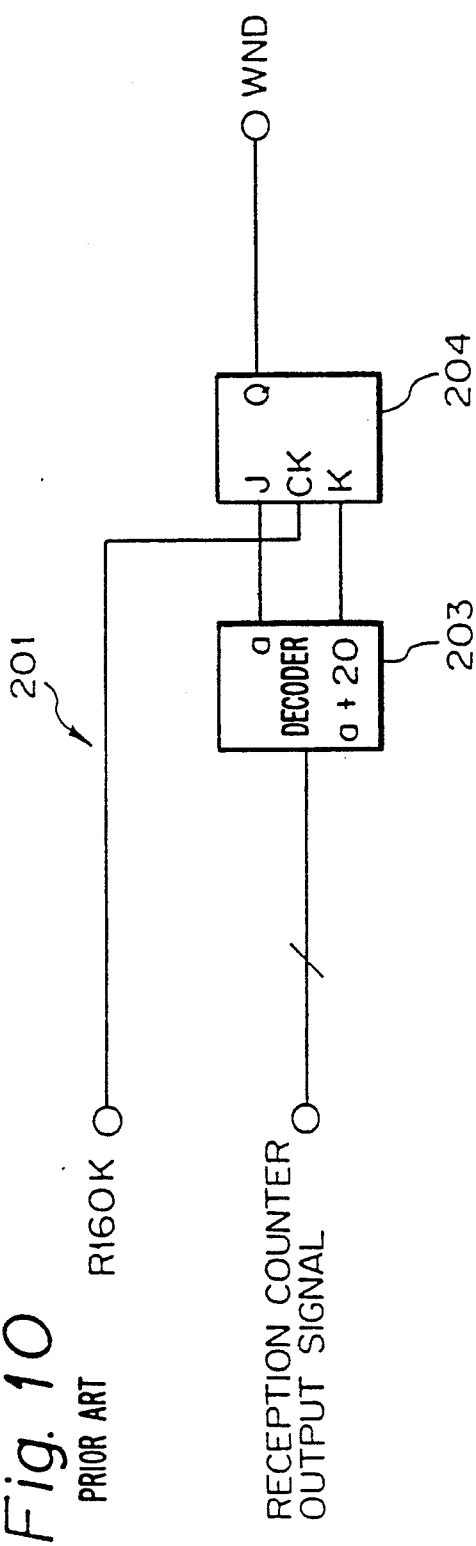
FIG. 10 is a block diagram showing the reception timing signal generator used in the conventional interface conversion circuit.
Figure 11:
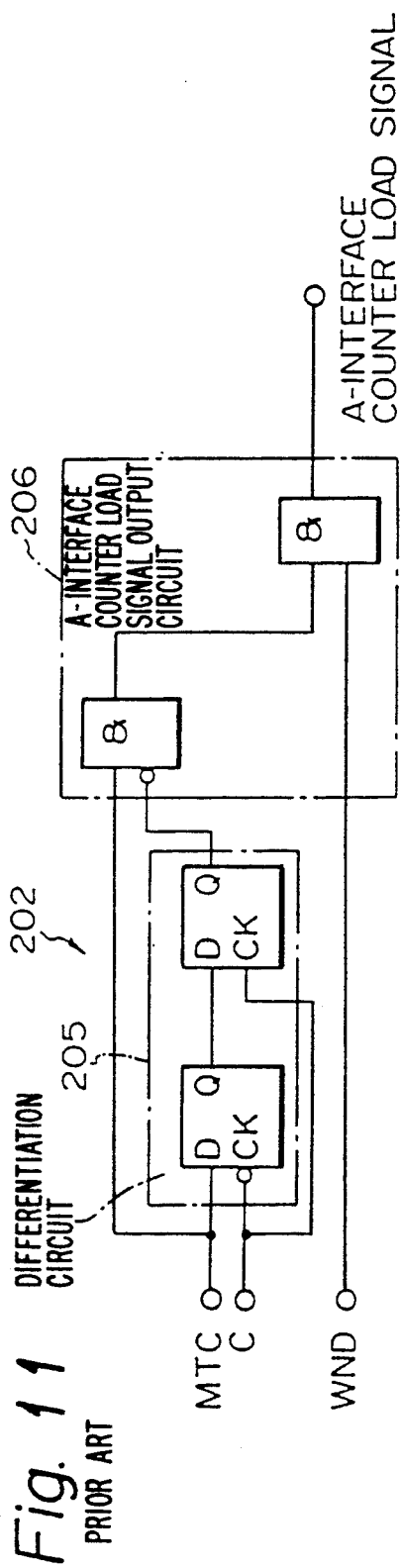
FIG. 11 is a block diagram showing the A-interface timing signal generator used in the conventional interface circuit.
Figure 12:
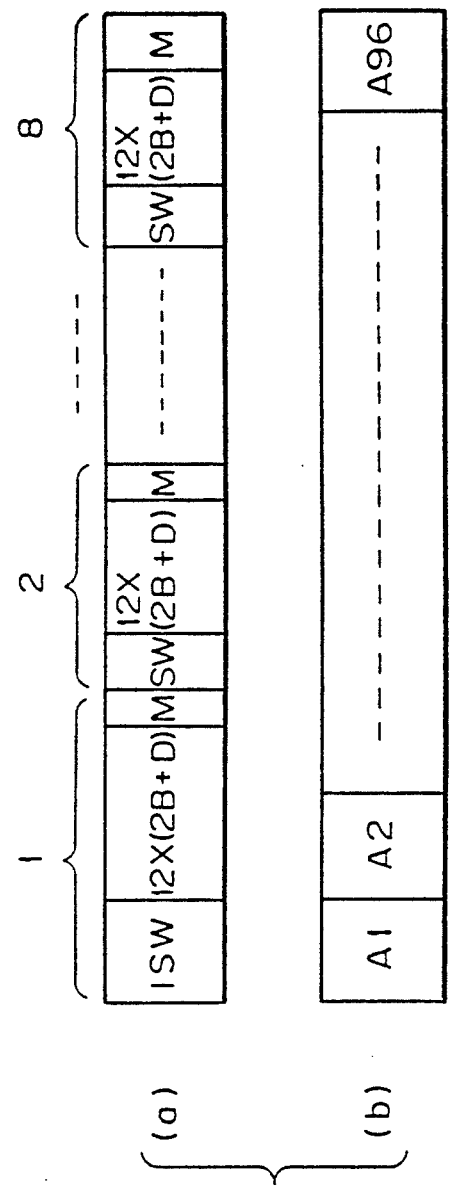
FIG. 12 (a) shows the frame structure in the U-interface, and FIG. 12 (b) shows the frame structure in the A-interface.
Figure 13:
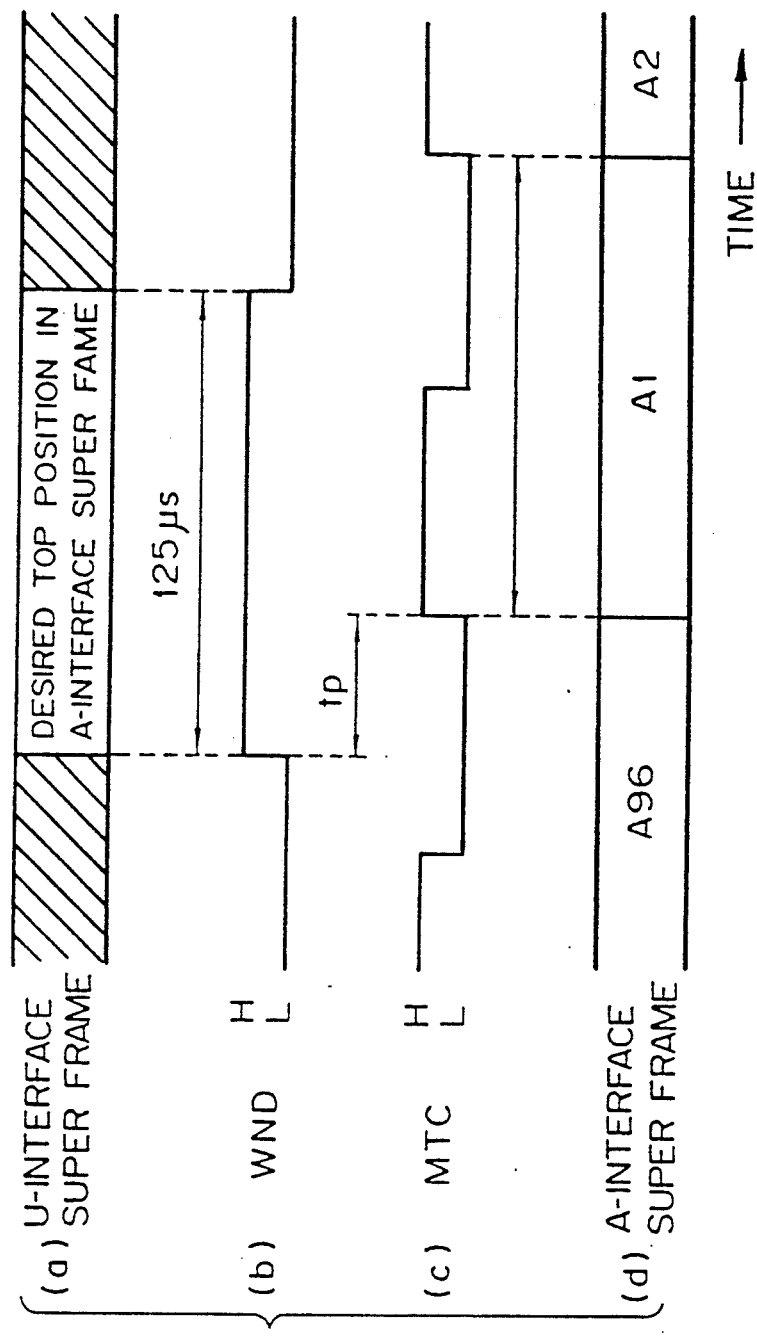
FIG. 13 is a time chart explaining the operation of the conventional interface conversion circuit.
Figure 14:
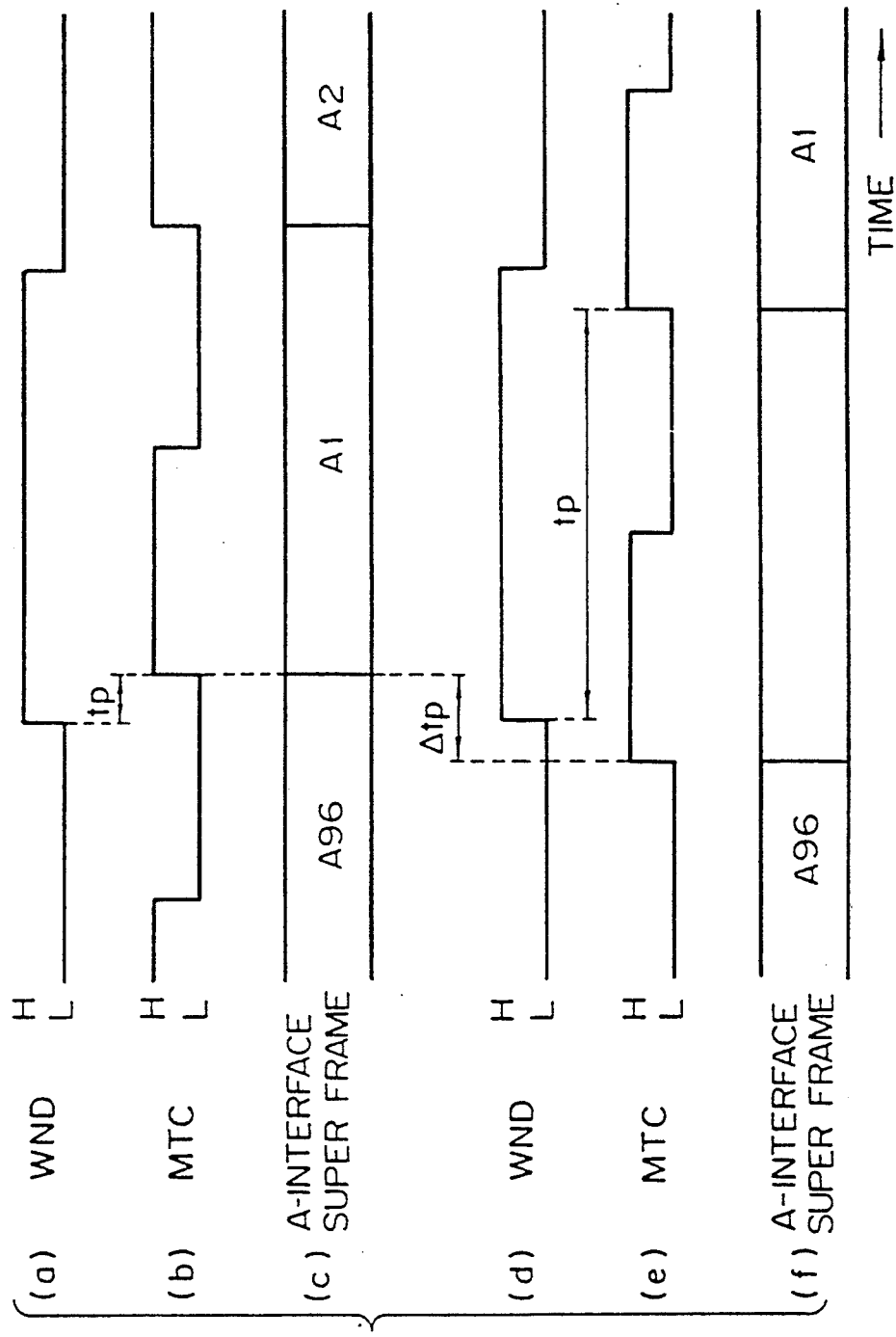
FIG. 14 is also a time chart explaining the operation of the conventional interface conversion circuit.
Figure 15:
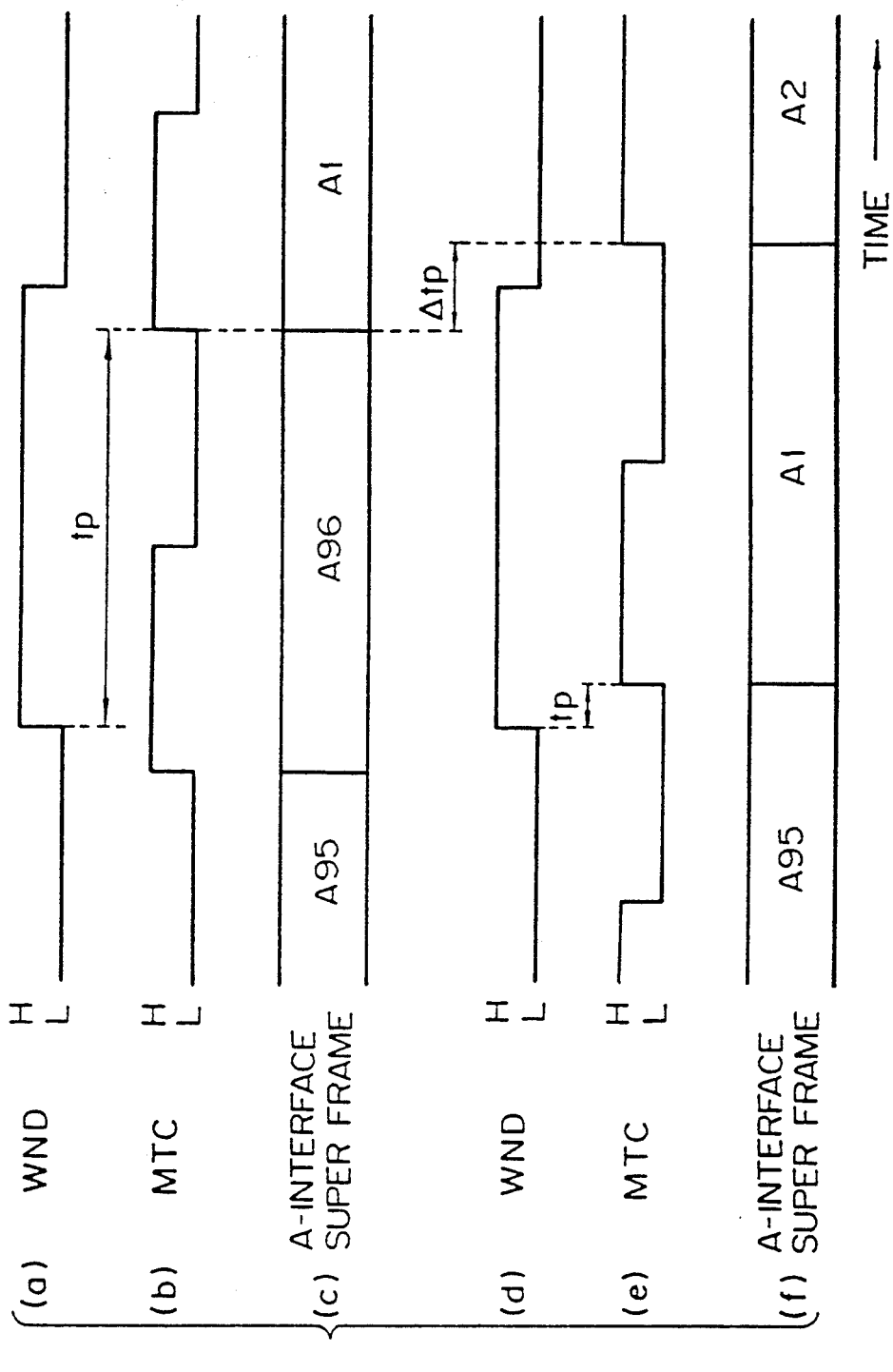
FIG. 15 is a time chart explaining the operation of the conventional interface conversion circuit.

A reception counter outputs corresponding to super frame bit positions shown in FIGS. 5 and 6; the decoder 11-1 decodes counter outputs corresponding to rises of the window signal WND and half window signal HWND and a fall of the half window signal HWND.

However, the decoder 11-1 decodes the one-bit preceding counter output to produce a window signal WND and a half window signal HWND as outputs from the JK flip-flops 11-3 and 11-4.

Namely, the decoder 11-1 decodes "−1", "0" and "1" about "0" at which the window signal WND and half window signal HWND rise; "9", "10" and "11" about "10" at which the half window signal HWND falls; and "19", "20" and "21" about "20" at which the window signal WND falls.

The selector 11-2 is provided with nine AND gates and three OR gates to receive outputs from the decoder 11-1. Upon receiving a select signal produced by the selector 11-5 from a reset signal RST and window control signal WNDCNT, these AND and OR gates work together to select one of "−1", "0" and "1" at which the window signal WND and half window signal HWND rise, one of "9", "10" and "11" at which the half window signal HWND falls and one of "19", "20" and "21" at which the window signal WND falls.

The output of the selector 11-2 is supplied to the JK flip-flops 11-3 and 11-4 to produce a window signal WND and half window signal HWND.

The select signal from the selector 11-2 adapted to select the central values "0", "10" and "20" when the reset signal RST=0, values one bit before the central values, that is, "−1", "9" and "19" when the reset signal RST=1 and window control signal WNDCNT=1, and values one bit after the center values, that is, "1", "11" and "21" when the reset signal RST=1 and window control signal WNDCNT=0.

The JK flip-flop 11-3 operates in response to the signal from the selector 11-2 to produce a window signal WND having a time duration of 20 bits, and the JK flip-flop 11-4 is operative in response to the signal from the selector 11-2 to produce a half window signal HWND having a time duration of 10 bits.

The selector controller 11-5 comprises a D flip-flop, two AND gates (one of which is to receive an inverted window control signal) and an inversion gate in combination. This selector controller 11-5 produces from the reset signal RST and window control signal WNDCNT a select signal that is supplied to the selector 11-2, and determines the rise timing and fall timing of the window signal WND and half window signal HWND.

Thus, if the window control signal WNDCNT=1 after resetting, the window signal WND and half window signal WNDCNT are shifted one bit ahead. When the window control signal WNDCNT=0, the signals WND and WNDCNT are shifted back one bit.

Figure 3:
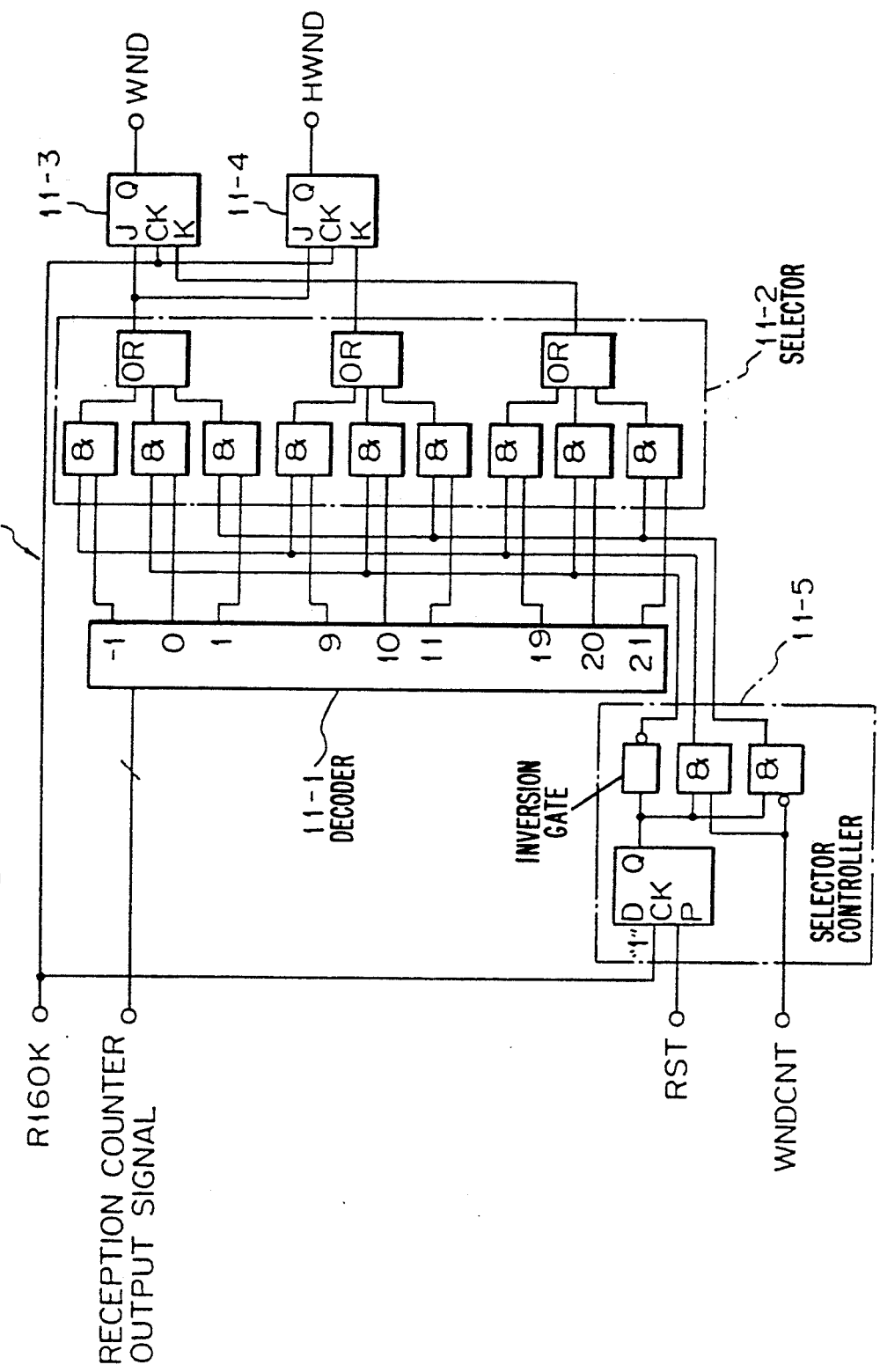
FIG. 3 is a block diagram showing the reception timing signal generator according to the first embodiment of the present invention.

As is apparent from the foregoing, the JK flip-flop 11-4 shown in FIG. 3 corresponds to the half window signal generator 3 shown in FIG. 1, and the selector 11-5 corresponds to the phase changing means 5 shown in FIG. 1.

Figure 4:
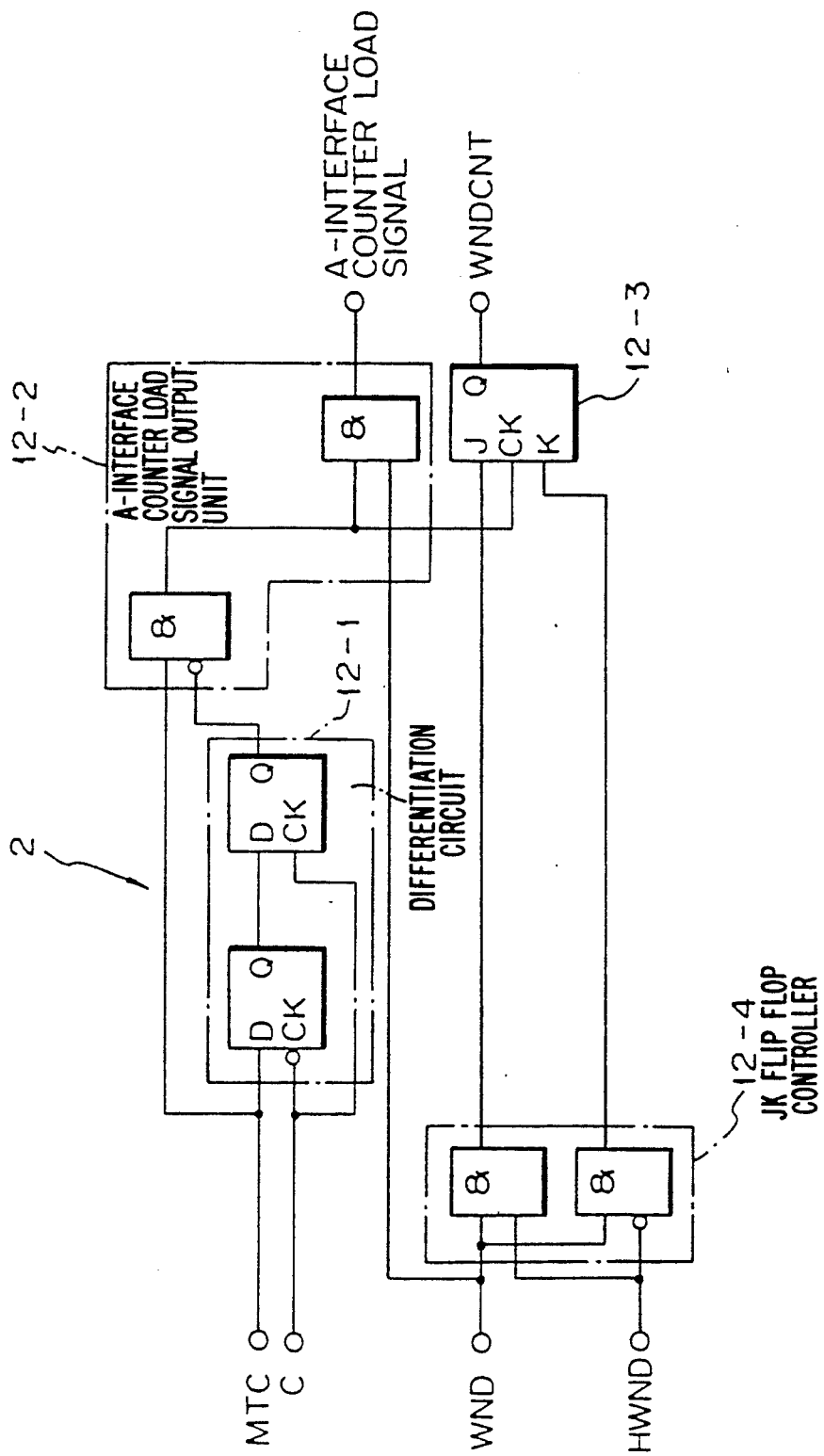
FIG. 4 is a block diagram showing the A-interface timing signal generator according to the first embodiment of the present invention.

As shown in FIG. 4, the A-interface timing signal generator 2 includes a differentiation circuit 12-1, an A-interface counter load signal output unit 12-2, a JK flip-flop 12-3 for the output of a window control signal and a JK flip-flop controller 12-4.

The differentiation circuit 12-1 comprises two D flip-flops. Supplied with the A-interface frame clock MTC and an A-interface bit clock C, this circuit 12-1 takes out one bit from the top of the A-interface frame clock MTC.

The A-interface counter load signal output unit 12-2 comprises two AND gates (one of which is used to receive an inversion output from the differentiation circuit 12-1). This output unit 12-2 ANDs the A-interface frame clock MTC with the inversion output from the flip-flop at the output stage of the differentiation circuit 12-1 and further ANDs this AND output with the window signal WND to produce an A-interface counter load signal.

The JK flip-flop 12-3 produces a window control signal WNDCNT, and the JK flip-flop 12-4 comprises two AND gates (one of which is to receive an inverted half window signal) to control the status of the window control signal WNDCNT from the JK flip-flop 12-3.

Of the signals supplied to the inputs of the JK flip-flop 12-3, the signal supplied to the J terminal is 1 when the window signal WND=1 and a half window signal HWND=1, and the signal to the K terminal is 1 when the window signal WND=1 and a half window signal HWND=0. The window control signal WNDCNT as output from the JK flip-flop 12-3 becomes 1 when the A-interface frame clock MTC rises in the former half of the window signal WND and becomes 0 when the frame clock MTC rises in the latter half.

The rise of the A-interface frame clock MTC during a period for which the window signal WND=1 is a load signal to the A-interface counter.

Thus, the reception timing signal generator 1 produces a window signal WND having a time duration of 20 bits (125 μs), which indicates a desired top position of the A-interface super frame and a half window signal HWND having a time duration of 10 bits (62.5 μs), the former half of the time period of the window signal WND.

Upon receiving the window signal WND and half window signal HWND, the A-interface timing signal generator 2 determines whether the A-interface frame clock MTC lies in the former or latter half of the window signal WND and supplies the reception timing signal generator 1 with the result as window control signal WNDCNT ("H" when MTC lies in the former half and "L" when it lies in the latter half).

Upon receiving the window control signal WNDCNT, the reception timing signal generator 1 shifts the window signal WND and half window signal HWND one bit ahead if the signal WNDCNT shows that the A-interface frame clock MTC is in the former half of the window signal WND, and one bit back if the signal WNDCNT shows that the frame clock MTC is in the latter half of the window signal WND.

In the reception timing signal generator 1, however, the window control signal WNDCNT is valid only after resetting.

As is apparent from the foregoing description, the JK flip-flop 12-3 in FIG. 4 corresponds to the frame clock position judging means 4 shown in FIG. 1.

FIG. 5 (a) to (g) shows an example in which the A-interface frame clock MTS lies in the former half of the window signal WND. As seen, after resetting the reset signal (resetting of "L"), the reception timing signal generator 1 receives a first window signal WND and half window signal HWND. After the window control signal WNDCNT becomes "H", the reception timing signal generator 1 receives that window control signal WNDCNT and the rise and fall of the window signal WND and those of the half window signal HWND are shifted to positions (indicated with sold lines) one bit ahead the normal positions (indicated with dash lines), respectively.

FIG. 6 (a) to (g) shows an example in which the A-interface frame clock MTC lies in the latter half of the window signal WND. As seen, after resetting the reset signal (resetting of "L"), the reception timing signal generator 1 receives a first window signal WND and half window signal HWND. When the window control signal WNDCNT becomes "L", the reception timing signal generator 1 receives that window control signal WNDCNT thereafter and the rise and fall of the window signal WND and those of the half window signal HWND are shifted to positions (indicated with sold lines) one bit after the normal positions (indicated with dash lines), respectively.

With such circuit arrangement, even if the value tp (time of shift between the rise of window signal WND and that of the A-interface frame clock MTC) is approximate to 0 or 125 μs, the value tp can necessarily be included in a range of 125 μs—$T_B$>Tp>$T_B$ from the next super frame.

Therefore, a relative jitter between clocks of both the can be absorbed with no frame shift-back or shift ahead.

In the aftermentioned embodiment, for a half window signal HWND that becomes "H" for a time duration of 10 bits (62.5 μs), the former half of the window signal WND is set in addition to the window signal WND to determine whether the A-interface frame clock MTC rises in the former or latter half of the window signal. Depending upon the result, the rise and fall of the window signal WND and those of the half window signal are shifted one bit ahead or back; however, even if the rise and fall are shifted two bits or more, the relative jitter between clocks of both interfaces can be absorbed.

As described in the foregoing, the interface conversion circuit according to the present invention uses, in addition to the window signal, a half window signal that becomes high or low only for the former half of the window signal, determines whether the frame clock of a second interface, such as A-interface, rises in the former or latter half of the window signal, and shifts, depending on the result, the rise and fall of the window signal and those of the half window signal a predetermined number of bits ahead or back, thereby permitting the fixing within a desired range of the phases of the super frame in the first interface such as an U-interface and a super frame in the second interface without being influenced by a relative jitter between the clocks of both interfaces.

I claim:

1. An interface conversion circuit for converting a frame structure of a first interface into a second interface, comprising:
    a first reception timing signal generator that produces a window signal having a predetermined time duration indicative of a frame top position in the second interface, the window signal having a former half and a latter half;
    a second interface timing signal generator that determines the frame top position in the second interface based on the window signal from the first reception timing signal generator and a frame clock;
    the first reception timing signal generator including a half window signal generator producing a half window signal having half of the time duration of the window signal and which rises or falls simultaneously with the window signal; and
    the second interface timing signal generator including a frame clock position judging means to determine phase of the frame clock with respect to the window signal based on the window signal from the first reception timing signal generator and the half window signal from the half window signal generator, and a phase changing means operative in response to judgment output from the frame clock position judging means to change phase relation between the half window signal and the frame clock.

2. An interface conversion circuit according to claim 1, wherein said frame clock position judging means is adapted to judge the tendency of a phase change of the frame clock with respect to the window signal.

3. An interface conversion circuit according to claim 1, wherein said frame clock position judging means judges whether the frame clock lies in one of the former half and latter half of the window signal.

4. An interface conversion circuit according to claim 1, wherein said phase changing means is operative in response to the judgment output from the frame clock position judging means to change the phase of the frame clock a predetermined value relative to the phase of one of the window signal and half window signal.

5. An interface conversion circuit according to claim 1, wherein said phase changing means operates in response to the judgment output from the frame clock positioning judging means to change phase of one of the widow signal and half window signal a predetermined value relative to phase of the frame clock.

6. An interface conversion circuit according to claim 1, wherein said phase changing means shifts one of the window signal and half window signal a predetermined number of bits ahead when the frame clock position judging means decides that the frame clock lies in the former half of the window signal.

7. An interface conversion circuit according to claim 1, wherein said phase changing means shifts one of the window signal and half window signal a predetermined number of bits back when the frame clock position judging means decides that the frame clock lies in the latter half of the window signal.

8. An interface conversion circuit for converting a frame structure of a first interface into a second interface, comprising:

a first reception timing signal generator producing a window signal having a predetermined time duration indicative of a frame top position in the second interface and including a half window signal generator producing a half widow signal having half of the time duration of the window signal, wherein the window signal has a former half and a latter half and wherein the half window signal simultaneously one of rises and falls with the window signal;

a frame clock generator producing a frame clock;

a second interface timing generator determining the frame top postion in the second interface based on the window signal from the first reception timing signal generator and the frame clock;

frame clock position judging means for determining phase of the frame clock with respect to the window signal and the half window signal, and for providing judgment output based on the phase; and phase changing means, responsive to judgement output, for changing phase relation between the half window signal and the frame clock.

* * * * *

UNITED STATES PATENT AND TRADEMARK OFFICE
CERTIFICATE OF CORRECTION

PATENT NO.  : 5,323,397
DATED       : June 21, 1994
INVENTOR(S) : Motoya KUROTSU It is certified that error appears in the above-indentified patent and that said Letters Patent is hereby corrected as shown below:

Column 1, Line 8, after "U-interface" insert a --,--.
Column 2, Line 31, change "lock" to --load--.
Column 8, Line 24, change "comprises" to --includes--.
Column 9, Line 50, before "can" insert --interfaces--; and between "shift" and "ahead" insert a -- - --.
*Column 12, Line 5, change "postion" to --position--.

Signed and Sealed this

Thirteenth Day of September, 1994

Attest:

BRUCE LEHMAN

Attesting Officer

Commissioner of Patents and Trademarks